United States Patent

McAndrew et al.

[11] Patent Number: 6,057,662
[45] Date of Patent: May 2, 2000

[54] SINGLE MOTOR CONTROL FOR SUBSTRATE HANDLER IN PROCESSING SYSTEM

[75] Inventors: Robert M. McAndrew, Austin; Tony Kroeker, Georgetown, both of Tex.

[73] Assignee: Applied Materials, Inc., Santa Clara, Calif.

[21] Appl. No.: 09/030,147

[22] Filed: Feb. 25, 1998

[51] Int. Cl.[7] .................................................. G05B 19/10
[52] U.S. Cl. ........................ 318/567; 318/590; 414/744.6; 414/744.5; 414/749
[58] Field of Search .................................. 318/443–444, 318/280, 560–689, 446; 414/744.1–744.8, 749

[56] References Cited

U.S. PATENT DOCUMENTS

| | | | |
|---|---|---|---|
| 3,927,436 | 12/1975 | Inoue et al. | 318/443 |
| 4,113,115 | 9/1978 | Yoshio . | |
| 4,874,286 | 10/1989 | Koster et al. . | |
| 4,906,905 | 3/1990 | Fuchigami | 318/460 |
| 5,147,175 | 9/1992 | Tada | 414/749 |
| 5,180,276 | 1/1993 | Hendrickson | 414/752 |
| 5,222,409 | 6/1993 | Dalakian . | |
| 5,227,708 | 7/1993 | Lowrance | 318/640 |
| 5,274,407 | 12/1993 | Haraguchi et al. . | |
| 5,288,379 | 2/1994 | Namiki et al. | 204/192.12 |
| 5,297,910 | 3/1994 | Yoshioka et al. | 414/225 |
| 5,330,301 | 7/1994 | Brancher | 414/417 |
| 5,365,301 | 11/1994 | Sugita et al. . | |
| 5,418,664 | 5/1995 | Ostwald . | |
| 5,447,409 | 9/1995 | Grunes et al. | 414/744.6 |
| 5,513,946 | 5/1996 | Sawada et al. | 414/744.5 |
| 5,562,387 | 10/1996 | Ishii et al. | 414/416 |
| 5,647,724 | 7/1997 | Davis, Jr. et al. | 414/744.5 |
| 5,725,352 | 3/1998 | Tanaka | 414/741.5 |

*Primary Examiner*—David Martin
*Attorney, Agent, or Firm*—Thomason Moser & Patterson

[57] ABSTRACT

A substrate handler for use in a chamber in a vacuum processing system has a single motor for controlling the substrate handler's rotation and extension functions. The single motor is connected to an operating assembly that operates in two modes to alternatively rotate or extend the substrate handler. The two modes are defined by the relative rotational motion of two drive mechanisms that are rotated by the single motor. When the relative rotational motion for the two drive mechanisms is in the same axial direction, then the operating assembly operates in the first mode. When the relative rotational motion for the two drive mechanisms is in the opposite axial direction, then the operating assembly operates in the second mode. The single motor operates one of the drive mechanisms and an assembly that alternatively operates the other drive mechanism in either the same or the opposite axial direction as the first drive mechanism. Under this operation, the substrate handler alternatively rotates or extends depending on whether the drive mechanisms rotate in the same or opposite axial directions.

22 Claims, 8 Drawing Sheets

SINGLE MOTOR CONTROL FOR SUBSTRATE HANDLER IN PROCESSING SYSTEM

BACKGROUND OF THE INVENTION

1. Field of the Invention

The present invention generally relates to methods and apparatuses for handling substrates in a processing system. Specifically, the present invention relates to methods and apparatuses for operating a substrate handling mechanism within a substrate processing system.

2. Background of the Related Art

Vacuum processing systems for processing 100 mm, 200 mm, 300 mm or other diameter substrates are generally known. Typically, such vacuum processing systems have a centralized transfer chamber mounted on a monolith platform. The transfer chamber is the center of activity for the movement of substrates being processed in the system. The substrates are introduced into the system through one or more load lock chambers mounted on the transfer chamber. One or more process chambers mount on the transfer chamber at slit valves through which substrates are passed by a substrate handler, or robot, pivotably mounted in the transfer chamber. The substrate handler transfers the substrates through the transfer chamber and between the various other chambers, including the process chambers and the load lock chambers, attached to the transfer chamber.

The substrate handler is rotatable, mounts in the middle of the transfer chamber and can access each of the process chambers and load lock chambers in order to transfer a substrate therebetween. A simplified illustration of a mechanism for a substrate handler to rotate, extend and retract its substrate blade 10 is shown in FIG. 1a. The substrate blade 10 attaches to two struts 12, 14. The struts 12, 14 attach to pivot arms 16, 18. The pivot arms 16, 18 rigidly attach to a lower magnet ring 20 and an upper magnet ring 22. The lower and upper magnet rings 20, 22 are supported on a motor assembly housing and are free to rotate back and forth. When both magnet arms 20, 22 rotate in the same direction, either clockwise or counterclockwise, then they cause the pivot arms 16, 18 to rotate the substrate blade 10 in the same direction. When the two magnet rings 20, 22 rotate in opposite directions, such as when the upper magnet ring 22 rotates counterclockwise as viewed from the top, and the lower magnet ring 20 rotates clockwise, then the pivot arms 16, 18 pivot together to cause the substrate blade 10 to extend outward, similar to the configuration shown in dashed lines in FIG. 3. The substrate blade 10 is retracted by reversing the rotation of the lower and upper magnet rings 20, 22. The mechanism for rotating the lower and upper magnet rings 20, 22 uses two motors to separately operate the two magnet rings 20, 22.

FIG. 1b shows a prior motor assembly for activating the rotation of the upper and lower magnet rings 22, 20. Upper and lower motors 24, 26 combined with gear reduction assemblies 28, 30 mount to the top 32 and bottom 34 of a motor assembly housing. A roughly cylindrically-shaped sidewall 36 supports the top 32 and bottom 34 and separates the ambient pressure environment on the inside of the motor assembly housing from the vacuum environment of the transfer chamber. The upper and lower gear reduction assemblies 28, 30 attach to upper and lower magnet clamps 38, 40 through drive shafts 42, 44, respectively. The upper and lower magnet clamps 38, 40 support upper and lower magnet rings 46, 48. The upper and lower magnet rings 46, 48 are magnetically coupled through the cylindrical sidewall 36 to the upper and lower magnet rings 22, 20, respectively, on the outside of the motor assembly housing.

As the inner upper and lower magnet rings 46, 48 rotate under the force of their respective motors 24, 26, the outer upper and lower magnet rings 22, 20 likewise rotate. The two motors 24, 26 can rotate the inner and outer magnet ring pairs 46, 48, 22, 20 in the same axial direction or in opposing axial directions in order to rotate, extend or retract the substrate blade 10 as described above. The separation of the inner and outer portions of the substrate handler by way of the magnetic coupling through the motor assembly housing effectively prevents particles and contaminants from entering the vacuum of the transfer chamber and potentially damaging the substrates being transferred therethrough.

Another example of a prior art motor assembly for activating the rotation of the upper and lower magnet rings 22, 20 is shown in FIG. 1c. This assembly uses two motors 50, 52 to drive two coaxial rings 54, 56 which mount two inner magnet rings (not shown) in turn to drive the outer magnet rings 22, 20, similar to the assembly shown in FIG. 1b. The drive shaft 58 connects motor 50 to gear 60. The gear 60 engages and drives gear 62, which is connected to inner shaft 64. The inner shaft 64 connects to the upper ring 54. Likewise, the motor 52 connects to drive shaft 66, which connects to gear 68. The gear 68 engages gear 70, which connects to outer shaft 72. The outer shaft 72 is coaxial with the inner shaft 64 and connects to lower ring 56. With this construction, the motor 52 operates the lower ring 56, and the motor 50 operates the upper ring 54.

A problem with these motor assemblies is that the two motors must be very carefully synchronized in order to properly move the substrate blade 10. If the motors do not operate in precise coordination, then the substrate blade 10 may be angled to one side or may be caused to wobble as it moves. For example, FIG. 1d shows a substrate handler with its pivot arms 16, 18 in solid lines properly coordinated to move the substrate blade 10 in a desired direction. However, if the motor operating pivot arm 16', shown in dashed lines, has an error, then the pivot arm 16' will be rotated slightly out of coordination with the pivot arm 18, and the substrate blade 10' will be slightly rotated to the side as well as partially retracted. This improper movement of the substrate blade 10 can result in an imprecise or unpredictable handling of a substrate and can misalign or damage a substrate on the substrate blade 10.

Attempts to maintain synchronization of the motors have typically involved programming the controller to monitor the errors detected in the rotation of the motors and to send commands to the motors to correct or coordinate the errors to achieve synchronization. This method requires highly sensitive sensors that send positional data to the controller and high-speed data transferring and processing capability to return the appropriate correction. To achieve this synchronization, a very complex system, with many potential points of failure, is needed to control operation of the substrate handler. Thus, the cost of the substrate handler and the potential for a failure in the system are fairly high.

Another problem with the two-motor substrate handlers described above is that the two motors require significant space. Two motors on top and bottom require space for the motors both above and below the assembly. Two motors on one side of the assembly require twice as much space on that side to house the two motors. Because of the overall size and complexity of a vacuum processing system, it is desirable to provide a substrate handler that occupies as little space as possible.

Another problem with the two-motor substrate handlers is the simple fact that two motors cost twice as much as one motor. Each motor represents a significant portion of the total cost of a substrate handler.

A need, therefore, exists for a substrate handler for use in a vacuum processing system that operates with only one motor that is no larger than a typical motor used in a prior art multi-motor substrate handler, but that can provide the same functionality as the prior art substrate handler with a simplified means for synchronizing the movement of the parts of the substrate handler.

SUMMARY OF THE INVENTION

A vacuum system has a transfer chamber with a dual-blade or single-blade substrate handler, or robot, for transferring substrates through the transfer chamber to and from process chambers. A single motor operates the substrate handler in two different operating modes. The first operating mode causes the substrate handler to rotate, and the second operating mode causes the substrate handler to extend or retract an end effector, or substrate handling arm. The operating modes are determined by the relative rotational motion between two drive mechanisms. The two drive mechanisms are arranged to rotate coaxial to each other either in the same axial direction or in opposite axial directions. Thus, the substrate handler functions under the first operating mode when the two drive mechanisms rotate in the same axial direction, and the substrate handler functions under the second operating mode when the two drive mechanisms rotate in opposite axial directions.

In one embodiment, the single motor operates three gears. One of the gears engages the first drive mechanism in order to rotate it, while the other two gears cooperate to separately engage the second drive mechanism in order to rotate it either in the same direction as the first drive mechanism or in the opposite direction. In this embodiment, a drive shaft attached to the single motor rotates all three gears in the same direction. The first gear is fixed on the drive shaft to always engage the first drive mechanism; whereas, the second two gears have a clutch assembly for alternatively engaging the drive shaft in order to alternatively operate a gear for the second drive mechanism from opposite sides of the axis of the gear. In another embodiment, the second two gears can simultaneously slide on the drive shaft in order to alternatively engage the gear for the second drive mechanism from the opposite sides of the axis of the gear.

In another embodiment, the single motor operates the first drive mechanism and a gear assembly through a drive shaft. The second drive mechanism is operated by a clutch assembly, which can alternatively engage either the drive shaft or the gear assembly. The gear assembly outputs a rotational motion opposite that of the motor and the drive shaft. Thus, the second drive assembly can rotate in the same direction as the first drive assembly or in the opposite direction, depending on whether the clutch assembly engages the drive shaft or the gear assembly, respectively.

With any of these embodiments, synchronization of the two drive assemblies is fairly simple, and the two drive assemblies will always be coordinated, since they operate under movement from the same motor.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6b is a bottom view of the gear assembly for the embodiment shown in FIG. 6a.

DETAILED DESCRIPTION OF THE PREFERRED EMBODIMENT

Figure 2:
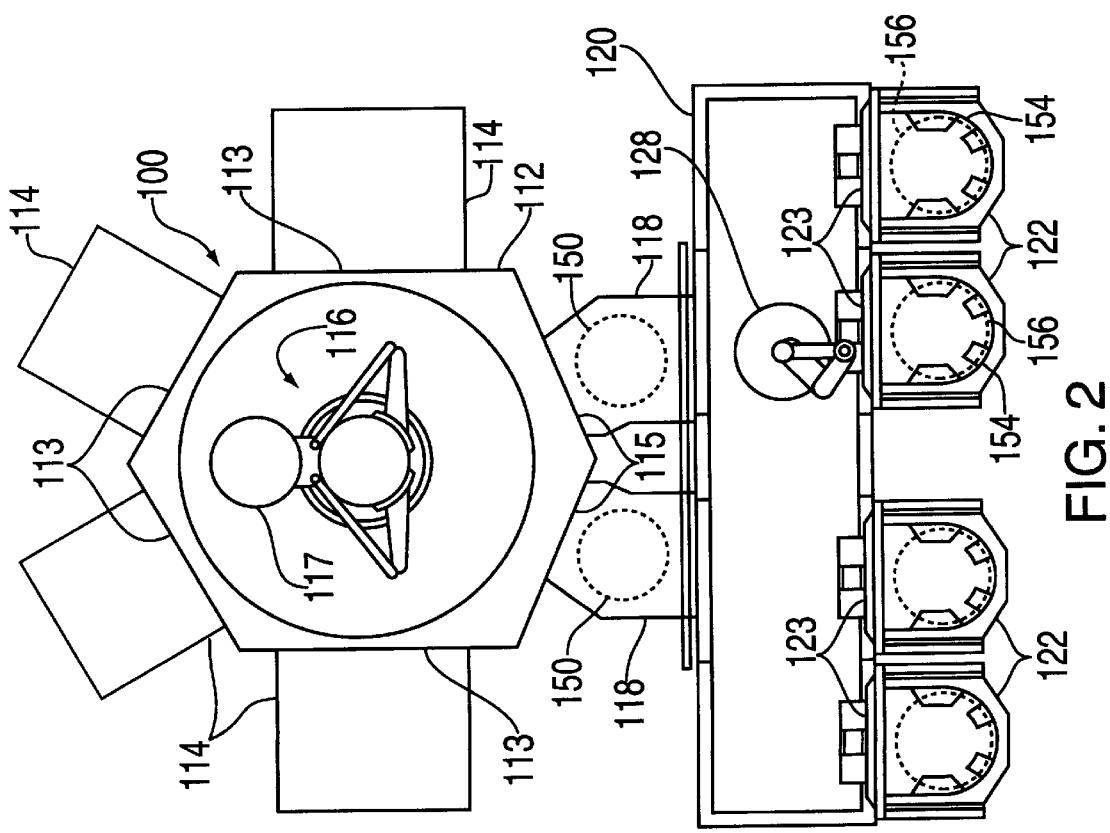
FIG. 2 is a top schematic view of a vacuum processing system.

FIG. 2 generally shows a schematic top view of an embodiment of a vacuum processing system 100 of the present invention. The vacuum processing system 100 includes a transfer chamber 112 typically mounted on a platform (not shown) and generally forming a system monolith. The transfer chamber 112 has four process chambers 114 mounted at facets 113. The transfer chamber 112 has two load lock chambers 118 mounted at facets 115. An optional mini-environment 120 attaches to the load lock chambers 118. The transfer chamber 112 and the mini-environment 120 both have a substrate handler 116, 128, or robot, for transferring substrates therethrough. The vacuum processing system 100 will be described in greater detail below in the System section.

The substrate handler 116 in the transfer chamber 112 is depicted as a single-blade substrate handler, meaning that it has one substrate blade, or end effector, 170 for transferring a substrate 117; but other types of substrate handlers, such as a dual-blade substrate handler, may be used with the present invention. The substrate blade 170 is the arm that handles or supports the substrate 117 while the substrate is being transferred through the transfer chamber 112. The substrate handler 116 can rotate clockwise or counterclockwise in order to face toward a process chamber 114 or a load lock chamber 118. It can also radially extend or retract the substrate blades 170 into a process chamber 114 or load lock chamber 118 in order to insert a substrate 117 therein or remove a substrate 117 therefrom. As will be described in detail below, the substrate handler 116 has a single motor for performing both rotation and extension.

Figure 1A:
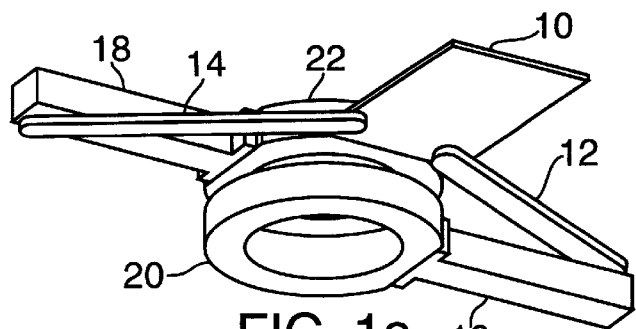
FIG. 1a is a perspective view of a prior art mechanism for manipulating a single-blade substrate handler.
Figure 1B:
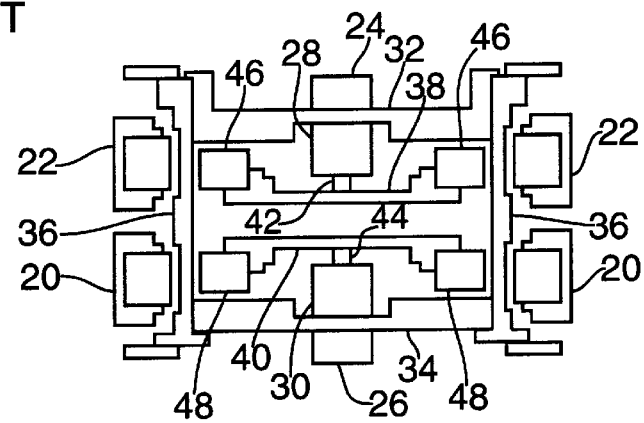
FIG. 1b is a side view of a prior art assembly for coupling a dual-motor actuator to a mechanism for manipulating a substrate handler.
Figure 1C:
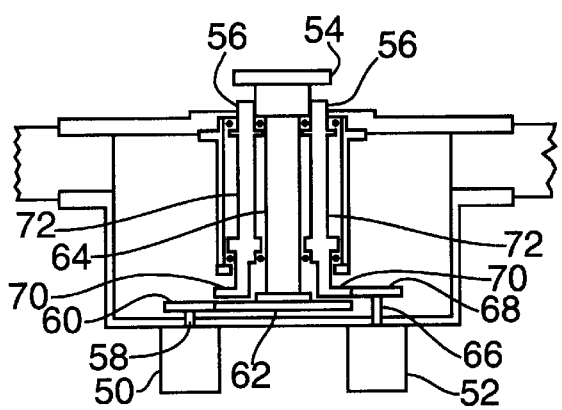
FIG. 1c is a side view of another prior art assembly for coupling a dual-motor actuator to a mechanism for manipulating a substrate handler.
Figure 1D:
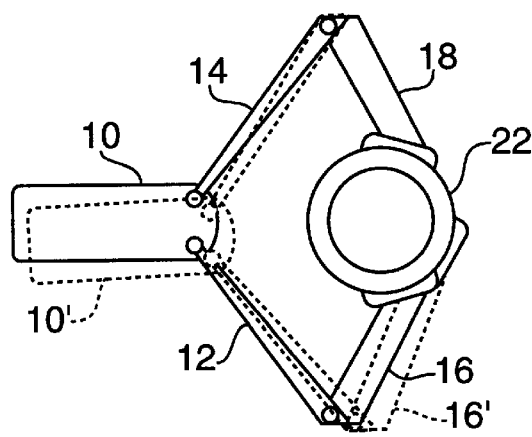
FIG. 1d is a top schematic view of a prior art substrate handler.
Figure 3:
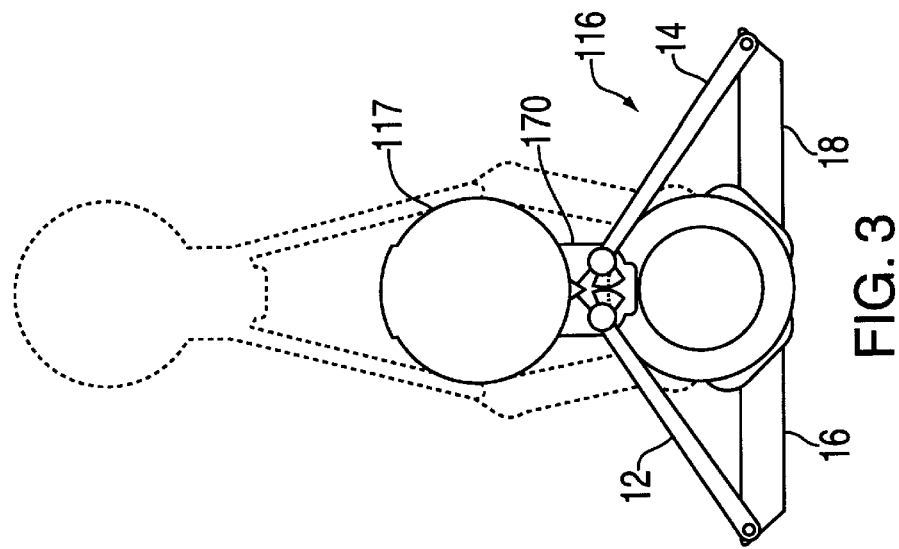
FIG. 3 is a top view of a single-blade substrate handler.

FIG. 3 shows a top view of an exemplary substrate handler 116. This type of substrate handler is generally referred to as a "frog-leg" type robot because the action of the pivot arms 16, 18 and the struts 12, 14 resemble frog legs. The solid lines show the substrate handler 116 in its rest, neutral or retracted position. The dashed lines show the substrate handler 116 in its extended position. Rotation of the substrate handler 116 generally occurs in the retracted position to ensure that the substrate does not contact any object in the chamber.

Figure 4A:
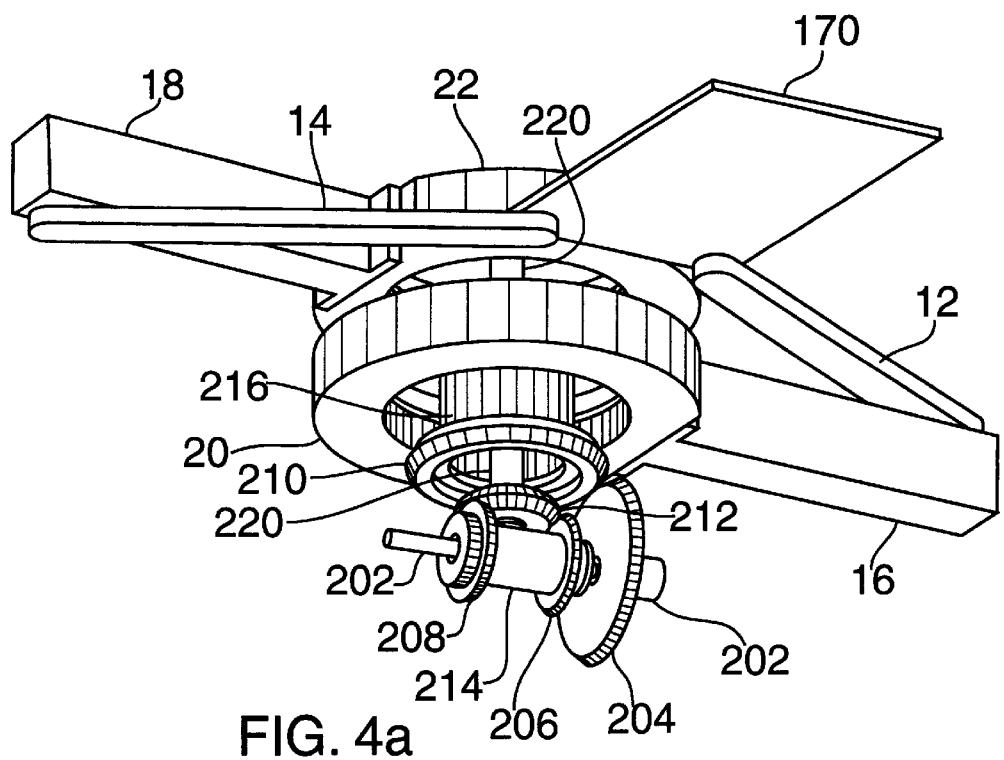
FIG. 4a is a perspective view of a single-blade substrate handler with a single motor.
Figure 4B:
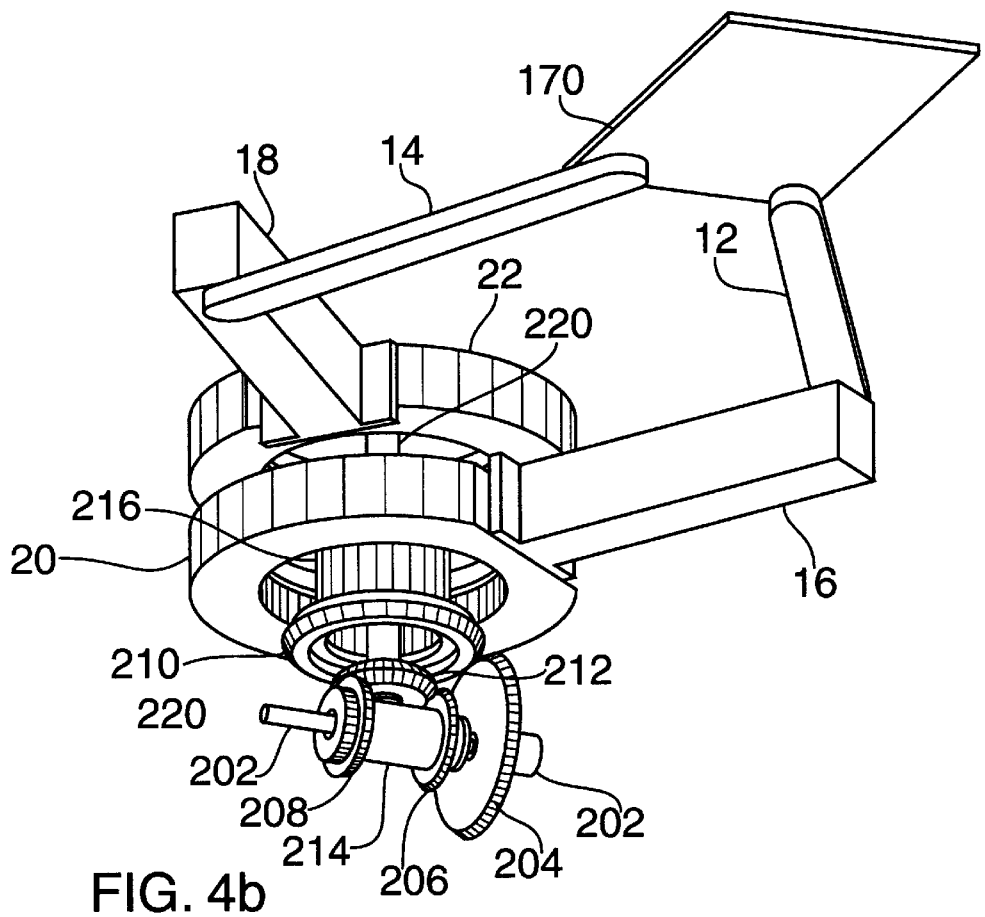
FIG. 4b is another perspective view of the single-blade substrate handler with a single motor.

FIGS. 4a and 4b show a bottom perspective view of one embodiment of a substrate handler without a housing for clarity. The upper and lower magnet rings 22, 20 operate the pivot arms 16, 18, the struts 12, 14 and the substrate blade 170. An inner drive assembly, with an inner shaft 220 and a gear 212, extends through an outer drive assembly, with an outer shaft 216 and a gear 210, to operate the upper magnet ring 22. The outer drive assembly operates the lower magnet ring 20. The gear 212 engages two gears 206, 208 with a clutch assembly 214 between them. The clutch assembly 214 alternatively engages the two gears 206,208 to a drive shaft 202. The gear 210 engages gear 204, which is attached to drive shaft 202.

FIG. 4a shows the substrate handler in its retracted position. FIG. 4b shows the same substrate handler in its extended position. In the retracted position, the magnet rings 22, 20 are shown to hold the pivot arms 16, 18 almost straight out from each other. In the extended position, however, the magnet rings 22, 20 hold the pivot arms 16, 18 closer together.

Figure 5:
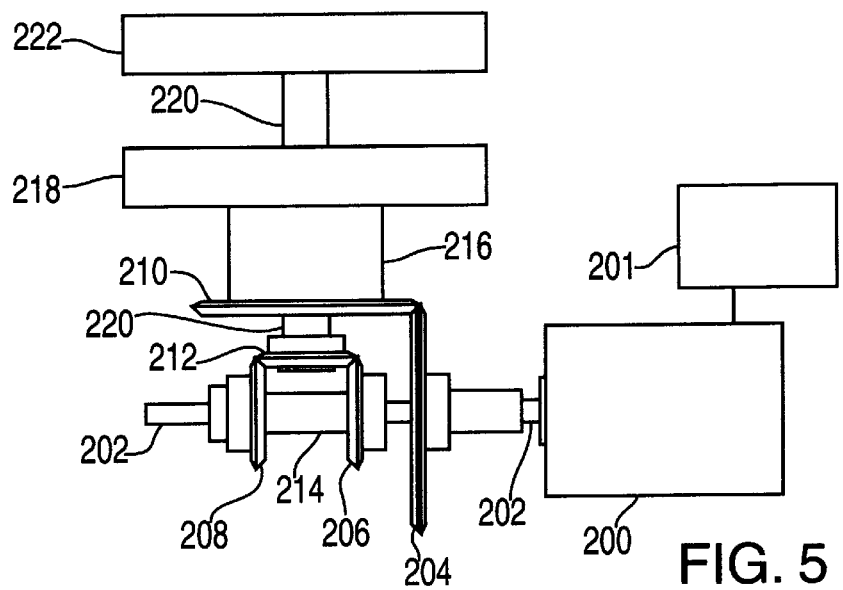
FIG. 5 is a side view of an embodiment of a motor and operating assembly for a substrate handler.

FIG. 5 illustrates the embodiment of an assembly for operating the mechanisms that drive the inner and outer drive assemblies shown in FIGS. 4a and 4b. A motor 200, operated by a controller 201, connects to the drive shaft 202. The motor 200 may be similar to the motor used to operate the prior art substrate handler 10. The first gear 204 is fixed in position on the drive shaft 202 in order to always engage and rotate the gear 210. The second and third gears 206, 208, however, are attached to the clutch assembly 214 to alternately engage and drive only one of the two gears 206, 208. In other words, only one of these two gears 206, 208 is operated by the drive shaft at a time, while the other gear rotates freely. Thus, both gears 206, 208 may engage the gear 212 at all times, but only one of the gears 206, 208 will operate the gear 212. In this manner, the clutch 214 may clamp the gear 206 to the drive shaft 202 in order to rotate the gear 212 in the same direction that gear 204 rotates the gear 210. While the clutch assembly 214 engages the gear 206, the gear 208 is freely rotated by the gear 212 in the opposite direction. Likewise, the clutch 214 may clamp the gear 208 to the drive shaft 202 in order to rotate the gear 212 in the opposite direction that gear 204 rotates the gear 210. While the clutch assembly 214, engages the gear 208, the gear 206 is freely rotated by the gear 212 in the opposite direction of gear 208. The timing for the clutch assembly 214 must be sufficiently close that no motion occurs in the substrate blade 170 during mode change. Additionally, it is preferred that spiral bevel gears or hypoid type gears be used for the gears 204, 206, 208, 210, 212, but other suitable gear types are contemplated by the present invention for smooth-running, high-accuracy applications.

The gear 210 connects through the shaft 216 to rotate a lower magnet ring 218. The gear 212 connects through the shaft 220 to rotate an upper magnet ring 222. The gear 210, shaft 216 and lower magnet ring 218 are coaxial with the gear 212, shaft 220 and upper magnet ring 222. Additionally, the ratio of the diameters of gear 204 to gear 210 is the same as the ratio of the diameter of gears 206, 208 to gear 212. Thus, when the gear 206 engages the gear 212, the two drive assemblies operate in a first mode, wherein the two magnet rings 218, 222 rotate in the same direction and at the same axial speed; but when the gear 208 engages the gear 212, the two drive assemblies operate in a second mode, wherein the two magnet rings 218, 222 rotate in opposite directions, but at the same axial speed. Thus, this operating assembly provides two coaxially rotating rings that rotate at substantially the same axial speed, but in either the same axial direction or the opposite axial direction. In this manner, the magnet rings 218, 222 are magnetically coupled to the outer magnet rings 20, 22, respectively, to provide the mechanism for driving the rotation and extension of the substrate handler 116.

The embodiment shown in FIGS. 4 and 5 discloses a configuration of gears that alternatively drives the inner shaft 220 from opposite sides of the gear 212, while the operation of the outer shaft 216 is fixed on just one side of its gear 210. A person skilled in the art, however, will recognize that the present invention also contemplates a configuration of gears that alternatively drives an outer shaft from opposite sides of its gear, while the operation of an inner shaft is fixed on just one side of its gear.

Figure 6A:
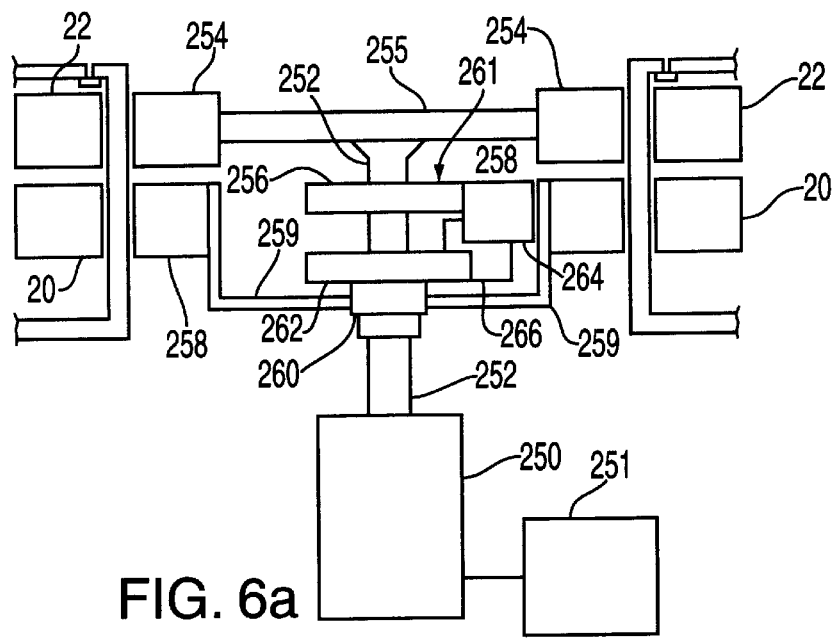
FIG. 6a is a side view of another embodiment of a motor and operating assembly for a substrate handler.

FIG. 6a shows an alternative embodiment for an assembly for driving two coaxially rotating magnet rings 254, 258 of substantially the same diameter at substantially the same axial speed, but in either the same or the opposite axial direction. Motor 250, operated by a controller 251, connects to a drive shaft 252. The drive shaft 252 connects to and rotates a gear 256 of a gear assembly 261 and the upper magnet ring 254, connected through arm 255. The lower magnet ring 258 connects to a clutch assembly 260. The clutch assembly 260 can alternatively engage either the drive shaft 252 or a gear 262 of the gear assembly 261 in order to rotate in the same direction or the opposite direction as the drive shaft 252 and the upper magnet ring 254.

Figure 6B:
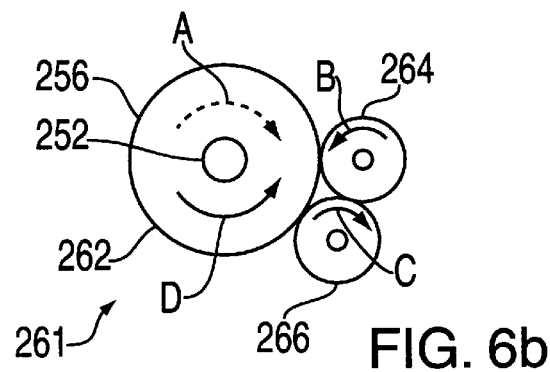

The gear assembly 261 includes the gears 262, 256 and two other gears 264, 266. FIG. 6b shows a front view of this gear assembly 261. The gears 256, 262 are both coaxial with the drive shaft and substantially the same diameter, so they appear the same in FIG. 6b, except that gear 262 does not connect to the drive shaft 252. The gear 256 engages to rotate the gear 264, which engages the gear 266, which engages the gear 262. The arrows A–D provide an example of the rotational movement of each gear 256, 264, 266, 262 in the gear assembly 261. When the gear 256 rotates in the direction of arrow A (shown in dashed lines since the gear 256 is behind the gear 262), the gear 264 rotates in the direction of arrow B, which rotates the gear 266 in the direction of arrow C, which rotates the gear 262 in the direction of arrow D, the opposite axial direction as arrow A. Thus, the gear assembly provides a rotational output that counter-rotates to the rotational input provided by the drive shaft 252. Additionally, the gears 264, 266 are of substantially the same diameter, so since the gears 256, 262 are also of substantially the same diameter, the rotational speeds of these two gears 256, 262 are substantially the same.

When the clutch assembly 260 engages the drive shaft 252, the drive shaft 252 rotates the lower magnet ring 258 in the same axial direction at substantially the same axial speed as the upper magnet ring 254. When the clutch assembly 260 engages the gear 262, however, the lower magnet ring 258 rotates in the opposite axial direction at substantially the same axial speed as the upper magnet ring 254. In this manner, the magnetic coupling of the inner magnet rings 254, 258 to the outer magnet rings 22, 20, respectively, provides the driving force for rotating, extending and retracting the substrate blade 170.

Figure 7:
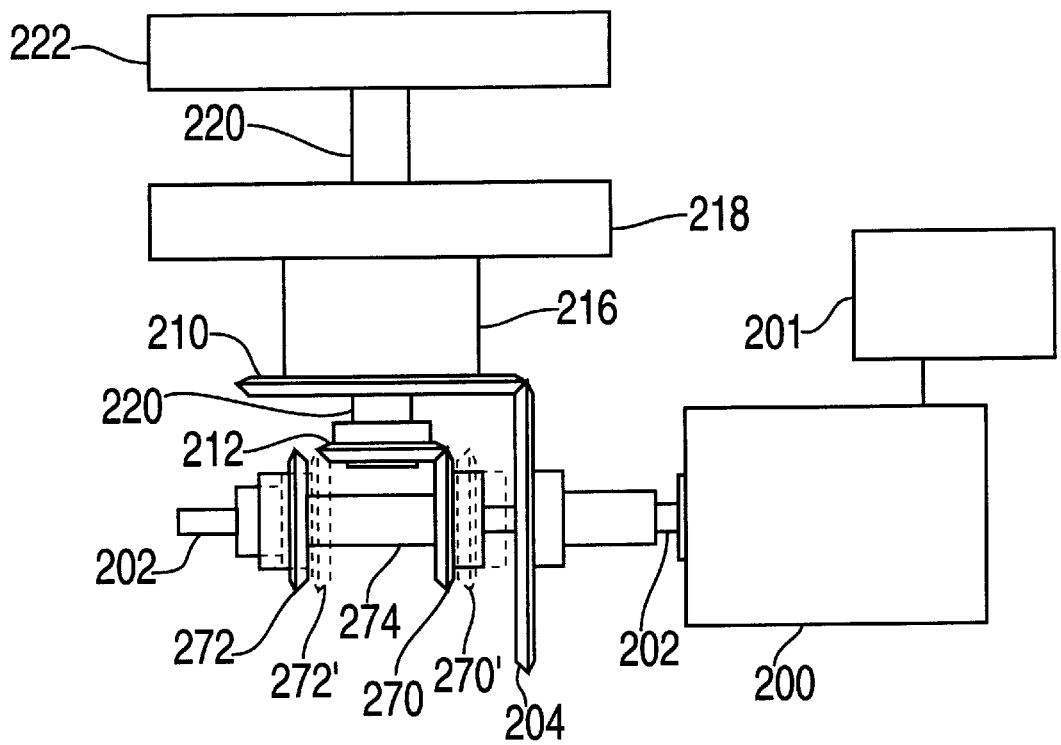
FIG. 7 is a side view of yet another embodiment of a motor and operating assembly for a substrate handler.

FIG. 7 illustrates another embodiment of an assembly for operating the mechanisms that drive the rotation and extension of the substrate handler 116. This embodiment is similar to the embodiment shown in FIGS. 4 to 5, except that this embodiment doesn't use a clutch assembly to change the rotation of the gear 212. A motor 200, operated by a controller 201, connects to a drive shaft 202 which connects to three gears, or gears, 204, 270, 272. The first gear 204 is fixed in position on the drive shaft 202 in order to always engage and rotate a gear 210. The second and third gears 270, 272, however, slide back and forth on the drive shaft 202 from the position of gears 270, 272 shown in solid lines to the position of gears 270', 272' shown in dashed lines. In this manner, the gear 270 engages and rotates the gear 212 while the gear 272 rotates freely when the two gears 270, 272 are slid to the left, and gear 272' engages and rotates the gear 212 while gear 270' rotates freely when the two gears 270', 272' are slid to the right. The timing between the gears that share shifting action must be sufficiently close that no motion occurs in the substrate blade 170 during mode change.

The gears 270, 272 are linked by sleeve 274 in order to cause them to slide the same. A shift mechanism (not shown) operates to slide the gears 270, 272 and the sleeve 274 back and forth. The shift mechanism may be actuated by any appropriate means, such as a pneumatic device, a solenoid or a magnetic or electromagnetic device.

The gear 210 connects through shaft 216 to rotate magnet ring 218. The gear 212 connects through shaft 220 to rotate magnet ring 222. The gear 210, shaft 216 and magnet ring 218 are coaxial with the gear 212, shaft 220 and magnet ring 222. Additionally, the ratio of the diameters of gear 204 to gear 210 is the same as the ratio of the diameter of gears 270, 272 to gear 212. Furthermore, when the gear 270 engages the gear 212, the drive assembly operates in the first mode to rotate the magnet ring 218 in the same direction as the magnet ring 222; but when the gear 272' engages the gear 212, the drive assembly operates in the second mode to rotate the magnet ring 218 in the opposite direction as the magnet ring 222. Thus, this operating assembly provides two coaxially rotating magnet rings that rotate at substantially the same axial speed, but in either the same axial direction or the opposite axial direction. In this manner, this assembly provides the mechanism for driving the rotation and extension of the substrate handler 116.

The embodiment shown in FIG. 7 discloses a configuration of gears that alternatively drives the inner shaft 220 from opposite sides of the gear 212, while the operation of the outer shaft 216 is fixed on just one side of its gear 210. A person skilled in the art, however, will recognize that the present invention also contemplates a configuration of gears that alternatively drives an outer shaft from opposite sides of its gear, while the operation of an inner shaft is fixed on just one side of its gear.

Figure 8A:
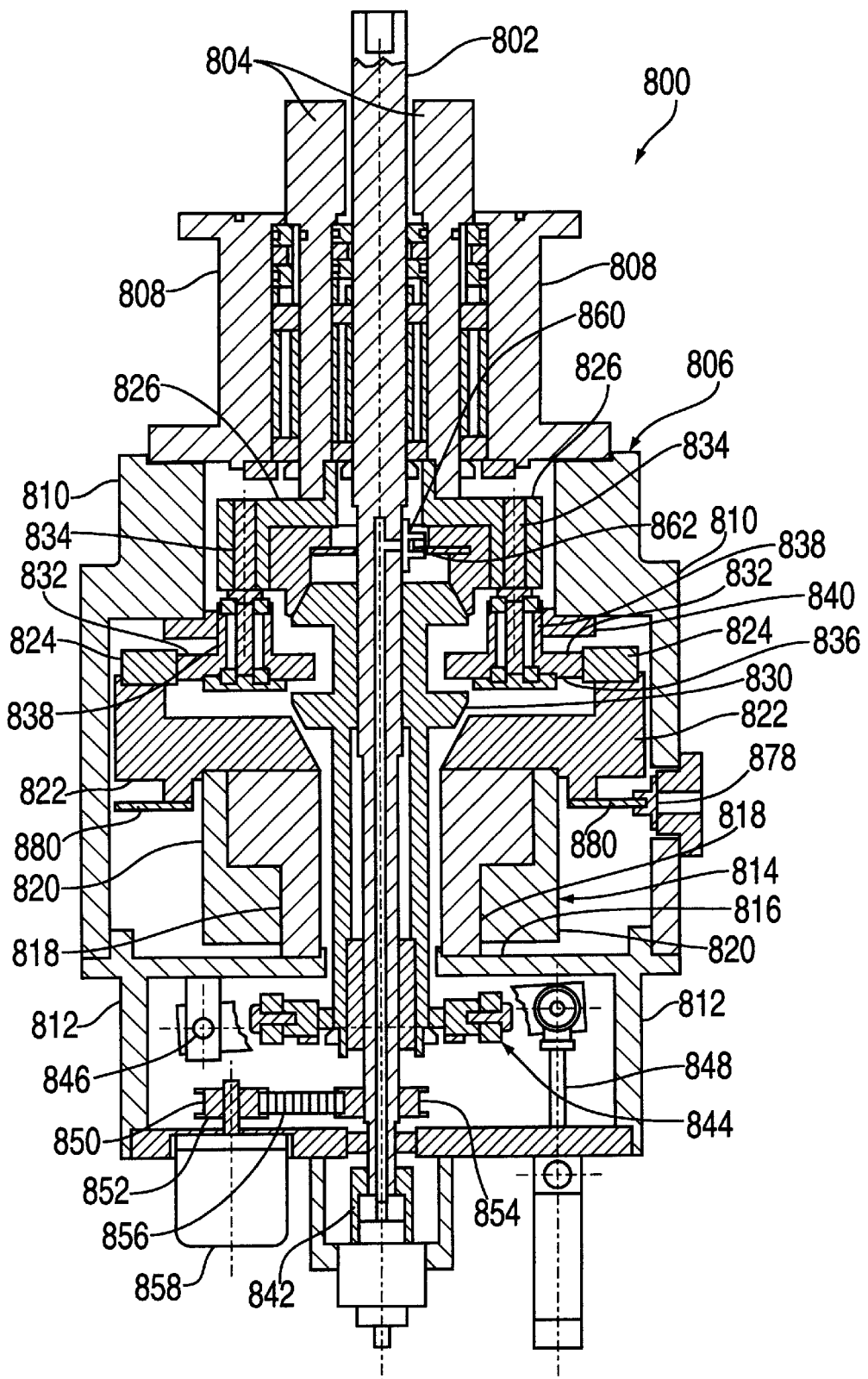
FIG. 8a is a side cross-sectional view of another embodiment of a motor and operating assembly for a substrate handler.
Figure 8B:
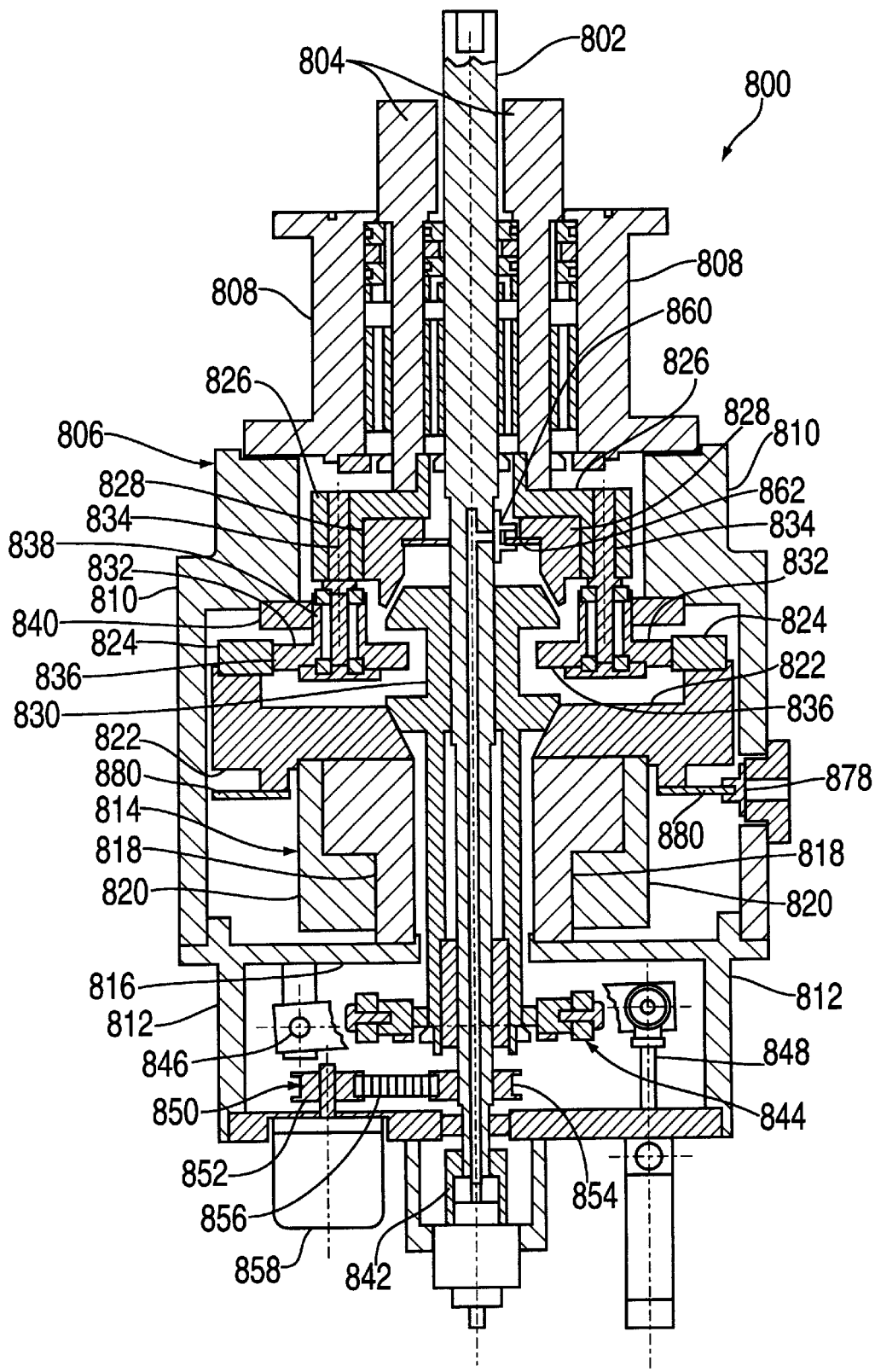
FIG. 8b is a side cross-sectional view thereof in a second position.

FIGS. 8a and 8b show yet another embodiment of an assembly 800 for operating the mechanisms that drive the rotation and extension of the substrate handler 116. The assembly 800 generally includes an inner shaft 802, an outer shaft 804 partially and concentrically surrounding the inner shaft 802, and a housing assembly 806 comprising a seal and bearing housing 808, a transmission housing 810 and a shift housing 812. A single motor assembly 814 mounts to an inner portion 816 of the shift housing 812 and drives both the inner shaft 802 and the outer shaft 804. The motor assembly 814 is disposed inside the transmission housing 810 and includes a motor stator 818 mounted to the inner portion 816 of the shift housing 812, a motor rotor 820 rotatably disposed around the motor stator 818, and a conical clutch 822 connected to the motor rotor 820 to rotate therewith inside the transmission housing 810. An outer ring gear 824 attaches to the conical clutch 822 to rotate therewith.

The inner shaft 802 and the outer shaft 804 extend out of the housing assembly 806 through the seal and bearing housing 808, wherein appropriate bearings permit the inner shaft 802 and the outer shaft 804 to rotate freely within the seal and bearing housing 808, to operate the substrate handler 116 through appropriate magnetic couplings as described above in the previous embodiments. The outer shaft 804 extends through the seal and bearing housing 808 into the transmission housing 810 to attach to a shaft extension 826, which, in turn, attaches to an outer conical clutch 828 for engaging a clutch shaft 830, described in more detail below, through which rotational motion may be translated to the inner shaft 802. The shaft extension 826 rotatably mounts a plurality of cluster gears 832, preferably four as shown schematically in FIG. 9, through pinion shafts 834. Each cluster gear 832 has an outer gear 836, which engages the outer ring gear 824, and an inner gear 838, which engages an inner ring gear 840, which is attached to the transmission housing 810. As the outer ring gear 824 rotates under the operation of the motor assembly 814, each of the cluster gears 832 is caused to rotate. Since the inner ring gear 840 is stationary, the action of the inner gear 838 on the inner ring gear 840 causes the shaft extension 826 and the outer shaft 804 to rotate as well.

Figure 9:
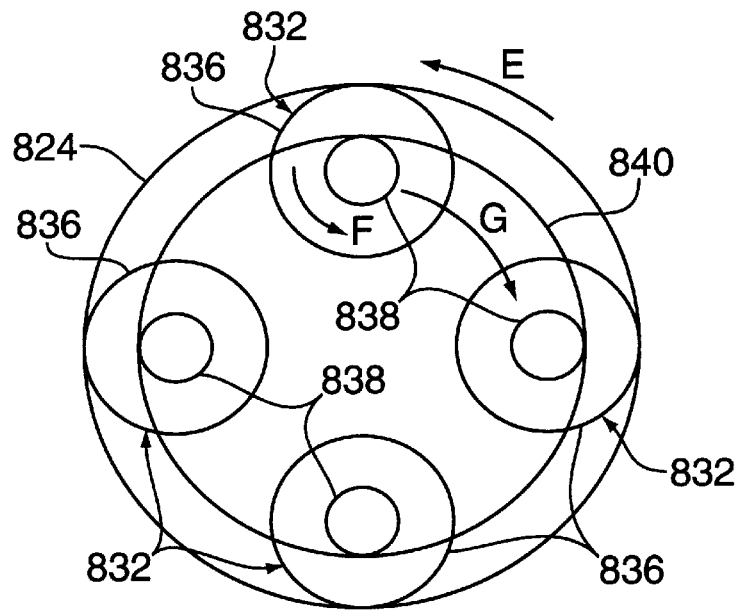
FIG. 9 is a side cross-sectional view of another embodiment of a motor and operating assembly for a substrate handler.

FIG. 9 shows a schematic top view of the inner ring gear 840, the outer ring gear 824 and the cluster gears 832 and illustrates the relative motion thereof As the outer ring gear 824 rotates in the direction of arrow E, the cluster gears 832 are caused to rotate in the direction of arrow F. Since the inner ring gear 840 is stationary, the action of the cluster gears 832 on the inner ring gear 840 causes each of the cluster gears 832 and, hence, the outer shaft 804 to rotate in the direction of arrow G. Thus, the outer shaft 804 rotates in the opposite direction of the rotation of the outer ring gear 824 and, hence, the motor rotor 820. The relative axial speed of the outer ring gear 824 and the outer shaft 804 can be determined by the relative geometries of the outer ring gear 824, the inner ring gear 840 and the outer gears 836 and inner gears 838 of the cluster gears 832. With an appropriate combination of gear geometries, the outer ring gear 824 and the outer shaft 804 can be made to rotate at about the same axial speed.

The inner shaft 802 extends through the outer shaft 804 in the seal and bearing housing 808, through the clutch shaft 830 and the motor assembly 814 in the transmission housing 810 and into the shift housing 812, wherein it is rotatably coupled to a coupling 842. The clutch shaft 830 is engaged to the inner shaft 802 to rotate therewith, but to permit the clutch shaft 830 to slide on the inner shaft 802 so as to engage the outer conical clutch 828 in one position (FIG. 8a) and to engage the conical clutch 822 in another position (FIG. 8b). A pivot rod assembly 844 engages the clutch shaft 830 to slide the clutch shaft 830 on the inner shaft 802 between the two positions. A pivot end of the pivot rod assembly 844 is rotatably fixed at a pivot point 846 connected to the housing assembly 806, and the opposite end of the pivot rod assembly 844 is rotatably attached to a pneumatic cylinder 848 mounted to the housing assembly 806 to pivot the pivot rod assembly 844 and, thereby, slide the clutch shaft 830 back and forth.

In the first position, when the clutch shaft 830 engages the outer conical clutch 828, the inner shaft 802 and the outer shaft 804 are directly coupled together through the shaft extension 826, the outer conical clutch 828 and the clutch shaft 830, so the inner shaft 802 rotates in the same direction and same axial speed as the outer shaft 804. In the second position, when the clutch shaft 830 engages the conical clutch 822, the inner shaft 802 and the motor rotor 820 are directly coupled together through the conical clutch 822 and the clutch shaft 830, so the inner shaft 802 rotates in the same direction and same axial speed as the motor rotor 820.

Since the outer shaft 804 and the motor rotor 820 rotate in opposite directions (discussion of FIG. 9, above), the position of the clutch shaft 830 alternatingly causes the inner shaft 802 and outer shaft 804 to rotate in either the same direction (position shown in FIG. 8a) or the opposite direction (position shown in FIG. 8b). Additionally, since the outer ring gear 824 and the outer shaft 804 can be made to rotate at about the same axial speed with an appropriate combination of gear geometries, the inner shaft 802 and the outer shaft 804 rotate at about the same axial speed. In this manner, the embodiment shown in FIGS. 8 and 9 can drive the rotation and extension of the substrate handler 116.

A timing pulley assembly 850, including two timing pulleys 852, 854 and a timing belt 856, is engaged between the inner shaft 802 and an encoder, or resolver, 858 to translate the rotation of the inner shaft 802 to the encoder 858 to provide feedback of the operation of the assembly 800 to a controller system. Additionally, a home sensor 860 is attached to rotate with the inner shaft 802, and a home flag 862 is attached to rotate with the outer conical clutch 828 and interact with the home sensor 860 to provide feedback of the rotational movement of the inner shaft 802 relative to the outer shaft 804, thereby indicating the extension or retraction of the assembly 800. Further, another home sensor 878 is mounted to the transmission housing 810, and another home flag 880 is attached to rotate with the conical clutch 822 and interact with the home sensor 878 to provide feedback of the absolute rotational motion of the shafts 802, 804.

Figure 10:
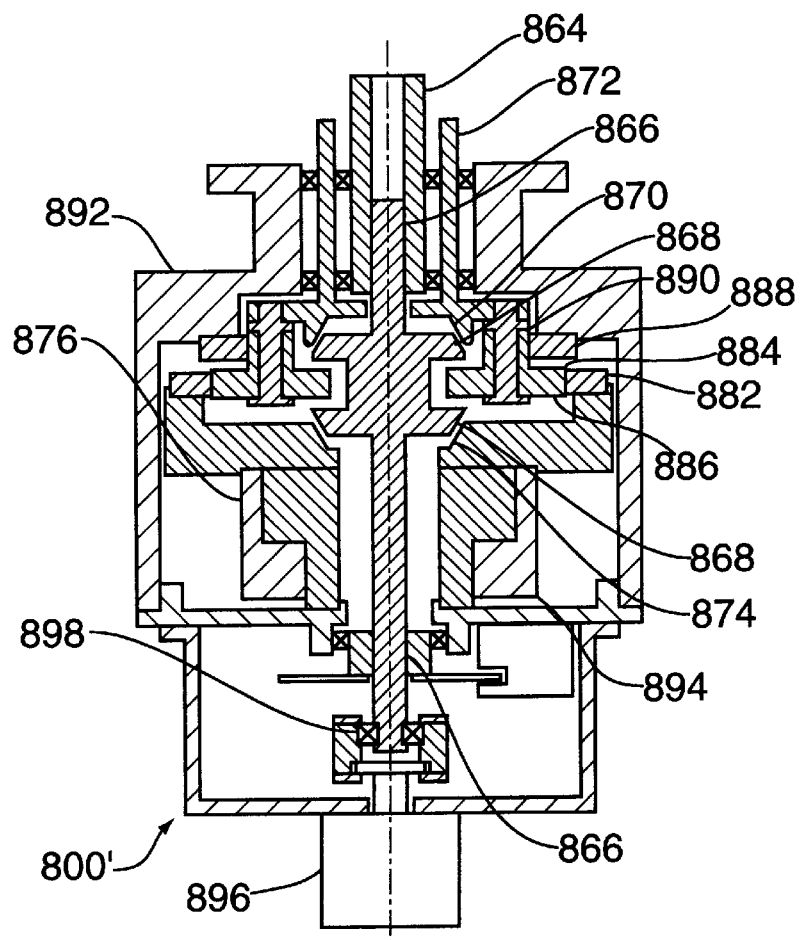
FIG. 10 is a top schematic view of a gear system for the embodiment shown in FIGS. 8 and 9.

FIG. 10 shows an alternative embodiment for an assembly 800' that is similar to the assembly 800 shown in FIG. 8 such that assembly 800' includes a single motor assembly 894 disposed within a housing assembly 892, an inner shaft 864, an outer shaft 872, an inner ring gear 888 attached to the housing assembly 892, a rotatable outer ring gear 882 operated by the motor assembly 894, an arrangement of cluster gears 886 coupled to the outer shaft 872 and interengaged with the inner ring gear 888 and the outer ring gear 882 to rotate as a group with the outer shaft 872 in the opposite direction as the outer ring gear 882 and the motor assembly 894, a clutch shaft 868 engaged to rotate with the inner shaft 864 and to slide relative thereto so as to be alternatively directly coupled to rotate either with the outer shaft 872 or with the motor assembly 894, and an appropriate clutch activator 896 connected to the clutch shaft 868 through a coupling 898 to move the clutch shaft 868 between alternative operating positions. The assembly 800' is similar in operation to assembly 800, except that the inner shaft 864 surrounds a clutch spline 866 of the clutch shaft 868, which alternatively engages and is driven by either the conical clutch 870 cooperatively engaged to the outer shaft 872 or the conical clutch 874 cooperatively engaged to the motor rotor 876. The operation of the assembly 800' is much the same as the operation of the assembly 800 in that the outer ring gear 882 is rotated by the conical clutch 874 and the motor rotor 876, the outer ring gear 882, in turn, drives the outer gear 884 of the cluster gear 886, and the inner ring gear 888 is fixed to the housing assembly 892, so that the action of the inner gear 890 on the inner ring gear 888 causes the cluster gears 886 to rotate as a group in the opposite direction as the outer ring gear 882, according to the discussion of FIG. 9, above. In this manner, the single motor assembly 894 can rotate the inner shaft 864 and the outer shaft 872 in the same direction or in the opposite direction.

The FIGS. 4 through 10 show four embodiments for operating a substrate handler with a single motor. The present invention, however, is not limited to these four embodiments. Rather, the invention contemplates other mechanisms for operating a substrate handler with a single motor, including, but not limited to, other assemblies for operating two drive mechanisms in two modes depending on the relative rotational motion of the two drive mechanisms.

Figure 11:
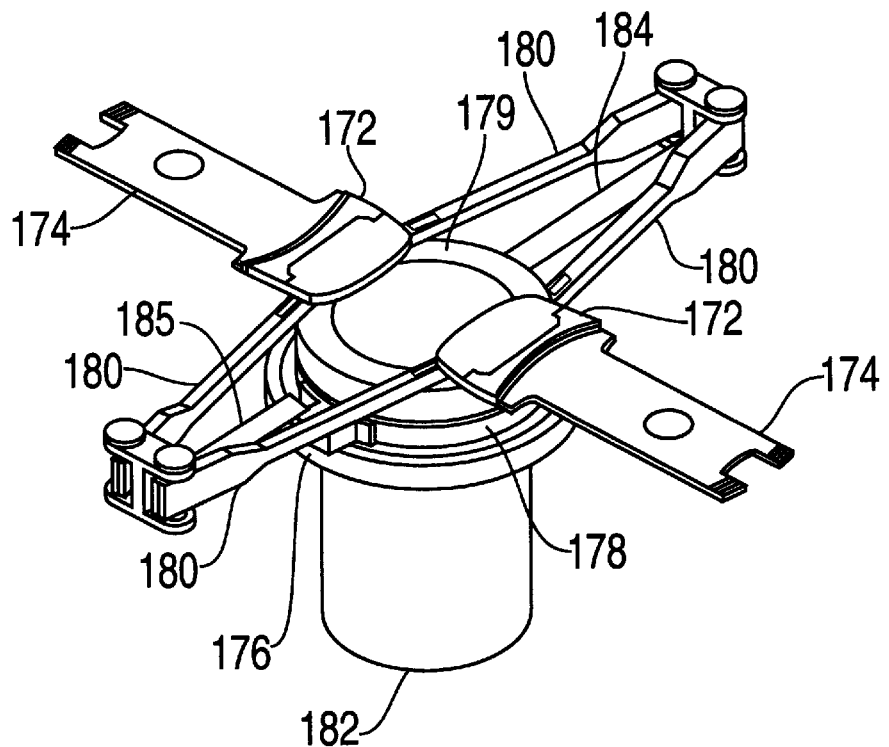
FIG. 11 is a perspective view of a dual-blade substrate handler.

FIG. 11 shows a dual-blade substrate handler, which may incorporate the present invention. Since it has attachments 172 for two end effectors, or substrate blades, 174, it can support two substrates at a time. It is sometimes preferable to have a substrate handler capable of handling two substrates at a time because, if each load lock chamber 118 and processing chamber 114 is fully loaded with a substrate, then the substrate handler has to have a place to temporarily store one substrate in order to transfer another substrate to the spot previously occupied by the first substrate. Otherwise, the system 100 would always have to provide at least one empty slot, thereby slightly decreasing the performance of the system. Thus, with two blades 174 available to support substrates, the substrate handler always has a space in which to place a substrate.

The substrate handler has a mounting plate 176 for mounting to the bottom of the interior of the chamber in which it resides. Above the mounting plate 176 is a lower magnet ring 178. Above the lower magnet ring 178 is an upper magnet ring 179. These magnet rings 178, 179 are magnetically coupled to the inner magnet rings described in the embodiments above and rotate relative to the mounting plate 176 in order to align one of the substrate blades 174 with a chamber opening in order to insert or remove a substrate. Upper and lower pivot arms 184, 185 attach to the upper and lower magnet rings 179, 178, respectively, and to the struts 180. The struts 180 connect to the supports 172 for the substrate blades 174. The magnet rings 178, 179 rotate in the same direction in order to rotate the substrate blades 174. The magnet rings 178, 179 rotate in opposite directions in order to pivot the pivot arms 185, 184 in the direction of one of the two substrate blades 174 in order to extend that substrate blade or retract the opposite substrate blade. Below the mounting plate 176 is the motor assembly housing 182 for containing a single-motor assembly for driving the rotation of the outer magnet rings.

The System:

Referring back to FIG. 2, an exemplary vacuum processing system 100 incorporating the present invention will now be described in detail. The process chambers 114 perform the substrate process on the substrates in the vacuum processing system 100. The process chambers 114 may be any type of process chamber, such as a rapid thermal processing chamber, a physical vapor deposition chamber, a chemical vapor deposition chamber, an etch chamber, etc. The process chambers 114 may be supported by the transfer chamber 112 or may be supported on their own platforms depending on the configuration of the individual process chambers 114. Slit valves (not shown) in the facets 113 provide access for the substrate handler 116 and isolation between the transfer chamber 112 and the process chambers 114. Correspondingly, the process chambers 114 have openings (not shown) on their surfaces that align with the slit valves.

The load lock chambers 118 support the substrates 150 on a set of substrate supports and transition the substrates 150 between the ambient environment pressure to the transfer chamber vacuum pressure. Openings (not shown) in facets 115 provide access and valves provide isolation between the load lock chambers 118 and the transfer chamber 112. Correspondingly, the load lock chambers 118 have openings on their surfaces that align with the openings in the facets 115. The load lock chambers 118 and the mini-environment 120 have corresponding openings (not shown) providing access therebetween, while doors (not shown) for the openings provide isolation.

The mini-environment 120 has four pod loaders 122 attached on its front side. Openings (not shown) with corresponding doors 123 provide access and isolation between the mini-environment 120 and the pod loaders 122. The pod loaders 122 are mounted on the side of the mini-environment 120 and are essentially shelves for supporting the substrates 156 in their substrate pods 154, which are used to transport the substrates 156 to and from the vacuum processing system 100.

A substrate handler 128 is disposed within the mini-environment 120 for transferring the substrates between the pod loaders 122 and the load lock chambers 118. The substrate handler 128 is typically mounted on a track so the substrate handler 128 can move back and forth in the mini-environment 120. Although the present invention has been described with reference to the transfer chamber substrate handler 116, it is understood that the invention is not so limited, but can be used with the mini-environment substrate handler 128 and other types of substrate handlers known in the industry.

In operation, a substrate pod 154 containing substrates 156 to be processed in the processing system 100 is loaded onto one of the pod loaders 122. The door 123 to the pod loaders 122 is opened and the substrate handler 128 moves the substrates 156, one at a time, from the substrate pod 154, through the mini-environment 120 and into one of the load lock chambers 118 until the load lock chamber is full of substrates 150. The load lock chamber 118 transitions the substrates 150 to the vacuum level of the transfer chamber 112. The transfer chamber substrate handler 116 rotates to face the load lock chamber 118. When the door to the load lock chamber 118 opens, the substrate handler 116 extends its substrate blade 170 into the load lock chamber 118 and retracts with a substrate 117. The substrate handler 116 rotates to face a process chamber 114 and extends to insert the substrate 117 therein. The substrate handler 116 retracts the substrate blade 170, so the process chamber 114 can perform the substrate process on the substrate 117. After processing, the substrate handler 116 transfers the substrate 117 from the process chamber 114 to the load lock chamber 118 by once again alternating extension and rotation operations. After the load lock chamber 118 returns the substrate to the pressure level of the ambient environment, the mini-environment substrate handler 128 transfers the substrate to the substrate pod 154. After the substrate pod 154 is full of processed substrates, the substrate pod 154 is removed and another substrate pod 154 containing substrates 156 to be processed in the processing system 100 is loaded onto the pod loader 122.

While the foregoing is directed to the preferred embodiment of the present invention, other and further embodiments of the invention may be devised without departing from the basic scope thereof, and the scope thereof is determined by the claims which follow.

We claim:

1. A substrate handler for use in a processing system, comprising:
   a pair of arms having a blade mounted at one end;
   a pair of rotating members, each rotating member having an arm connected thereto; and
   a single motor adapted to drive the pair of rotating members in the same direction to rotate the blade and in opposite directions to extend or retract the blade.

2. The substrate handler of claim 1 further comprising a pair of shafts coupled to the single motor to selectively rotate in the same direction or in opposite directions, each shaft cooperatively engaged with a rotating member.

3. The substrate handler of claim 2 further comprising:
   a first gear connected to a first shaft of the pair of shafts and a second gear connected to a second shaft of the pair of shafts;
   a third gear coupled to the single motor and engaging the second gear to rotate the second gear; and
   a clutch assembly coupled to the single motor and engaging the first gear to selectively rotate the first gear in the same direction as the second gear or in the opposite direction as the second gear.

4. The substrate handler of claim 3 further comprising:
   a drive shaft mounted to the single motor and connected to the third gear and the clutch assembly.

5. The substrate handler of claim 2 further comprising:
   a first gear connected to a first shaft of the pair of shafts and a second gear connected to a second shaft of the pair of shafts;
   a third gear coupled to the single motor and engaging the second gear to rotate the second gear; and
   a gear assembly coupled to the single motor and having a fourth gear and a fifth gear selectively engageable with the first gear to selectively rotate the first gear in the same direction as the second gear or in the opposite direction as the second gear.

6. The substrate handler of claim 5 further comprising:
   a drive shaft mounted to the single motor and connected to the third gear and the gear assembly.

7. The substrate handler of claim 2 further comprising:
   a clutch engaged between the pair of rotating members.

8. The substrate handler of claim 1 further comprising:
   a clutch assembly selectively engageable with the second rotating member to selectively rotate the second rotating member in the same direction as the first rotating member or in the opposite direction as the first rotating member.

9. A substrate handler for use in a processing system, comprising:

a handling arm, capable of extension, adapted to transfer a substrate through the substrate handling chamber; and a single motor coupled to the substrate handler and the handling arm and adapted to selectively rotate the substrate handler and extend or retract the handling arm.

10. The substrate handler of claim 9 further comprising:

an operating assembly having a first drive mechanism coupled to a substrate handler and a second drive mechanism coupled to the substrate holder.

11. The substrate handler of claim 10 wherein:

the operating assembly includes:
- a drive shaft connected to the single motor; and
- a first gear, a second gear and a third gear attached to the drive shaft;

the first gear engageable with the first drive mechanism; and the second gear and the third gear selectively engageable with the second drive mechanism.

12. The substrate handler of claim 11 further comprising:

a clutch coupled to the second and third gears.

13. A method of operating a substrate handler in a processing system comprising:

(a) providing a single motor;

(b) providing a first drive mechanism operatively engaged with the single motor;

(c) providing a second drive mechanism operatively engaged with the single motor;

(d) rotating the substrate handler by operating the first drive mechanism in a first rotational motion relative to the second drive mechanism; and (e) extending or retracting a handling arm by operating the first drive mechanism in a second rotational motion relative to the second drive mechanism.

14. The method of claim 13 wherein:

rotating the substrate handler comprises:
- (g) rotating the first drive mechanism in a first axial direction; and
- (h) rotating the second drive mechanism in the first axial direction; and extending the handling arm comprises:
- (i) rotating the first drive mechanism in a second axial direction; and
- (j) rotating the second drive mechanism in a third axial direction opposite from the second axial direction.

15. A processing system comprising:

a first chamber;

a second chamber connected to the first chamber;

a substrate handler disposed within the second chamber; and a single motor coupled to the substrate handler and adapted to selectively rotate and extend or retract the substrate handler.

16. The processing system of claim 15 further comprising:

an operating assembly having a first drive mechanism coupled to the substrate handler and a second drive mechanism coupled to the substrate handler.

17. The processing system of claim 16 wherein:

the operating assembly includes:
- a drive shaft connected to the single motor; and
- a first gear, a second gear and a third gear attached to the drive shaft;

the first gear engageable with the first drive mechanism; and the second gear and the third gear selectively engageable with the second drive mechanism.

18. The processing system of claim 17 further comprising:

a clutch coupled to the second and third gears.

19. A substrate handling chamber for use in a processing system comprising:

an enclosure;

a substrate handler having a handling arm; and a single motor coupled to the substrate handler and adapted to selectively rotate the substrate handler and extend or retract the handling arm.

20. The substrate handling chamber of claim 19 further comprising:

an operating assembly having a first drive mechanism coupled to the substrate handler and a second drive mechanism coupled to the substrate holder.

21. The substrate handling chamber of claim 20 wherein:

the operating assembly includes:
- a drive shaft connected to the single motor; and
- a first gear, a second gear and a third gear attached to the drive shaft;

the first gear engageable with the first drive mechanism; and the second gear and the third gear selectively engageable with the second drive mechanism.

22. The substrate handling chamber of claim 21 further comprising:

a clutch coupled to the second and third gears.

* * * * *